United States Patent [19]

Inomata et al.

[11] Patent Number: 4,504,327
[45] Date of Patent: Mar. 12, 1985

[54] CORROSION-RESISTANT AND WEAR-RESISTANT MAGNETIC AMORPHOUS ALLOY AND A METHOD FOR PREPARING THE SAME

[75] Inventors: Koichiro Inomata, Yokohama; Hiroshi Tateishi, Zushi; Emiko Higashinakagawa, Kawasaki; Kanemitsu Sato, Yokohama, all of Japan

[73] Assignee: Tokyo Shibaura Denki Kabushiki Kaisha, Kawasaki, Japan

[21] Appl. No.: 518,850

[22] Filed: Aug. 1, 1983

[30] Foreign Application Priority Data

Sep. 6, 1982 [JP] Japan .................. 57-153836
Sep. 7, 1982 [JP] Japan .................. 57-154559

[51] Int. Cl.$^3$ .............. C22C 38/10; C22C 38/12; C22C 1/00
[52] U.S. Cl. ................ 148/31.55; 148/31.5
[58] Field of Search ............. 148/31.55, 31.5

[56] References Cited

U.S. PATENT DOCUMENTS

| | | | |
|---|---|---|---|
| 3,578,920 | 5/1971 | Okamoto | 179/100.2 C |
| 4,225,339 | 9/1980 | Inomata et al. | 148/31.55 |
| 4,265,684 | 5/1981 | Boll | 148/31.55 |
| 4,416,709 | 11/1983 | Ohya et al. | 148/31.55 |
| 4,440,720 | 4/1984 | Masumoto et al. | 148/31.55 |

FOREIGN PATENT DOCUMENTS 57935 8/1982 European Pat. Off. .

OTHER PUBLICATIONS

Chem. Abs., vol. 88: 40458d, p. 170, 1978.
European Search Report–EP 83 10 7853, 9/12/83.

*Primary Examiner*—Veronica O'Keefe
*Attorney, Agent, or Firm*—Schwartz, Jeffery, Schwaab, Mack, Blumenthal & Koch

[57] ABSTRACT

There are disclosed a corrosion-resistant and wear-resistant magnetic amorphous alloy characterized by having, on the surface thereof, an oxide layer including a crystalline oxide and a method for preparing the same characterized by carrying out the oxidation treatment of the magnetic amorphous alloy at a high temperature and at a high pressure in order to form an oxide layer including a crystalline oxide on the surface of the magnetic amorphous alloy.

The magnetic amorphous alloy according to this invention possesses a remarkable corrosion resistance and wear resistance and had an improved magnetic permeability in the mega-Hertz zone.

10 Claims, 3 Drawing Figures

F I G. I

CORROSION-RESISTANT AND WEAR-RESISTANT MAGNETIC AMORPHOUS ALLOY AND A METHOD FOR PREPARING THE SAME

This invention relates to an amorphous alloy and a method for preparing the same, more particularly to an amorphous alloy which has an improved corrosion resistance and wear resistance and has an enhanced magnetic permeability in a mega-Hertz zone, and a method for preparing the same.

In recent years, the amorphous alloy prepared by the use of a liquid quenching method attracts the attention of those skilled in the art as a novel metallic material, in that it possesses excellent magnetic properties such as a high magnetic permeability and a low magnetic induction, and satisfactory mechanical and electrical properties such as a high hardness. Especially, such an amorphous alloy is expected to have a great usefulness as a magnetic material.

Seeing that the magnetic material is exposed to a variety of atmospheres, it is significant that the magnetic material is corrosion-resistant, for example, under high-temperature and high-humidity conditions, or in an acidic or basic atmosphere.

As known, the amorphous alloys each including compositely a Cr-P material have an excellent corrosion resistance, but the other amorphous alloys are usually active and therefore are poor in corrosion resistance. The incorporation of the P element is not so preferable, because this element drops a crystallization temperature, and tends to segregate and is poor in thermal stability under conditions of a high temperature. Accordingly, for the acquisition of a good thermal stability, the employment of the composite Cr-P containing material cannot be recommended. However, the reduction in corrosion resistance is inevitable, unless the Cr-P containing material is used.

Further, it is also known that the amorphous alloy is very hard but is generally inferior in wear resistance. For example, its amount of wear loss by sliding abrasive wear of a magnetic tape is highly great, as compared with a ferrite having half the hardness. Particularly, the amorphous alloy containing the majority of cobalt (Co) and several atomic % of iron (Fe) is very small in magnetic strain, therefore the deterioration in its magnetic properties by an external stress is also small. This is the reason why such an amorphous alloy is recommended as an alloy for a magnetic head. However, it has been found that the amorphous alloy has as very high a Vickers hardness as approximately 1000, but its wear loss by the tape is unexpectedly large, when it is used as the magnetic head. As well known, the wear phenomenon of the magnetic head by the tape is generally intricate and cannot be elucidated only with its hardness.

Heretofore, in the case that the amorphous alloy is used as a magnetic material, for the purpose of forming an insulating layer thereon, there has been employed a method in which the amorphous alloy is immersed into an oxidizing bath at a temperature of 100° C. or below, alternatively an anodizing process has been adopted to form an oxide layer (Japanese Provisional Patent Publication No. 46539/1979). However, the oxide layer formed by either method above includes no crystalline oxide. Further, according to researches by the present inventors, it has been found that the oxide layer prepared by either method above is in a thin and amorphous state, and a bond strength between the oxide layer and the amorphous alloy thereunder is weak. Therefore, such amorphous alloy having the oxide layer has neither corrosion resistance nor wear resistance to an enough extent, and when it is employed as the magnetic head, the oxide layer is apt to peel off disadvantageously by a slide of the tape thereon.

This invention has been achieved to overcome the aforesaid faults of the conventional amorphous alloy and its manufacturing method, and an object of this invention is to provide an amorphous alloy which has an improved corrosion resistance and wear resistance and has an enhanced magnetic permeability in a mega-Hertz zone, and a method for preparing the same.

In view of the above-mentioned situation, the present inventors have conducted intensive researches, and have found that the object of this invention can be accomplished by the oxidation treatment of an amorphous alloy at a high temperature and at a high pressure, and this invention has been now established.

The amorphous alloy according to this invention is characterized by having, on the surface thereof, an oxide layer including a crystalline oxide. In addition, the method for preparing the amorphous alloy according to this invention is characterized by carrying out the oxidation treatment of the amorphous alloy at a high temperature and at a high pressure in order to form the oxide layer thereon including a crystalline oxide.

Figure 1:
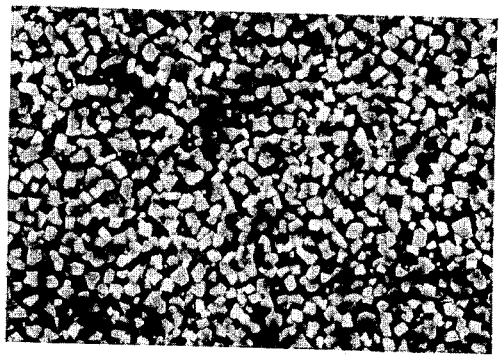
FIG. 1 is a photograph showing the surface of an amorphous alloy (Example 1) according this invention on a scale enlarged as much as 2500 times.

This invention will be further described in detail as follows:

A corrosion-resistant and wear-resistant amorphous alloy according to this invention has, on the surface thereof, an oxide layer including a crystalline oxide. As the amorphous alloy having the oxide layer thereon according to this invention, any one is usually acceptable so long as it is usable as a magnetic material, but examples of such amorphous alloy have, for example, the following composition:

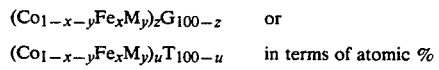

wherein
M is at least one element selected from the group consisting of Ti, V, Cr, Mn, Ni, Cu, Zr, Nb, Mo, Ru, Rh, Pd, Ag, Hf, Ta, W, Re, Pt, Au, Y and rare earth elements;

G is at least one element selected from the group consisting of B, C, Si, P and Ge;

T is at least one element selected from the group consisting of Ti, Zr, Hf, V, Nb, Ta, W, Mo, Y and rare earth elements; and x, y, z and u are values satisfying the relations of $0 \leq x \leq 1$, $0 \leq y \leq 0.2$, $65 \leq z \leq 90$ and $85 \leq u \leq 95$, respectively.

Components of the oxide layer on the amorphous alloy and the crystalline oxide in the oxide layer are, depending upon the main component of the amorphous alloy, for example, $Fe_3O_4$, $\gamma\text{-}Fe_2O_3$ and the like on condition that the main component of the amorphous alloy is Fe, or are CoO, $Co_3O_4$ and the like on condition that it is Co, but these oxide layer components vary with manufacturing conditions. Further, in the case that Co and Fe both are included in the amorphous alloy, the aforesaid components are Co-Fe oxides such as $CoFe_2O_4$ and the like.

The thickness of the oxide layer on the amorphous alloy according to this invention is preferably within the range of 0.05 to 5 $\mu$m, more preferably within the range of 0.1 to 1 $\mu$m. When the thickness of the oxide layer is less than 0.05 $\mu$m, the growth of the crystalline oxide is insufficient, and the improvement in the corrosion resistance and wear resistance is unsatisfactory; when it is more than 5 $\mu$m, the proportion of the amorphous alloy is reduced, which fact is practically undesirable.

The grain size of the crystalline oxide included in the oxide layer is preferably within the range of 0.01 to 5 $\mu$m, more preferably within the range of 0.1 to 2 $\mu$m. When this grain size is less than 0.01 $\mu$m, the corrosion resistance and wear resistance cannot be improved to an enough extent; when it is more than 5 $\mu$m, the internal amorphous alloy phase underneath the oxide layer is crystallized in part, whereby it is impossible to obtain an enough mechanical strength and magnetic properties.

The amorphous alloy according to this invention can be prepared as follows:

As the amorphous alloy material, a compound having the aforesaid composition can be employed.

One requirement to provide the amorphous alloy with an excellent corrosion resistance and wear resistance is that the amorphous alloy has, on the surface thereof, the oxide layer including the crystalline oxide, and for the manufacture of such an amorphous alloy, the oxidization treatment is required to be carried out at a high temperature and a high pressure.

The temperature at this treatment is preferably regulated as high as possible since the formation of the crystalline oxide can be completed in a short period of time, but if it is too high, there will occur a problem that the amorphous alloy thereunder is crystallized. Therefore, the treatment temperature is desirably less than the crystallization temperature, and concretely, it is preferably within the range of 150° to 500° C., more preferably within the range of 250° to 400° C. As a means for increasing the aforesaid treatment pressure, a gas or liquid may be employed, and the obtained pressure is preferably within the range of 40 to 200 atm, more preferably within the range of 60 to 100 atm. The time required for the above-mentioned treatment is, depending upon the selected treatment temperature and pressure, generally within the range of 0.5 to 100 hours, particularly preferably within the range of 5 to 24 hours.

It is a usual and easy manner to carry out the treatment in a high-temperature water vapor in an autoclave or the like.

According to the method of this invention, the amorphous alloy is improved in the corrosion resistance and wear resistance, even if any crystalline oxide mentioned above is formed thereon, as be apparent from the results of corrosion and wear tests mentioned below.

Now, this invention will be further described in detail in accordance with examples.

EXAMPLE 1

By the use of a single roll process, an $(Fe_{0.95}Cr_{0.05})_{85}Si_3B_{12}$ amorphous alloy of 10 mm in width and 20 $\mu$m in thickness was prepared. A portion of the prepared alloy was cut off therefrom to obtained a sample of approximately 1 m in length, and the sample was exposed to conditions of 400° C. and 105 atm for a period of 12 hours in an autoclave. The sample removed therefrom had a black surface. According to the observation of the surface state on the sample with the aid of a scanning type electron microscope (SEM), it was found that crystalline oxides as fine as approximately 1 $\mu$m were deposited on the internal amorphous alloy phase, as exhibited in FIG. 1. The identification of the deposited crystalline oxide was carried out by the use of an X-ray diffractometry, and it was judged to be $Fe_3O_4$.

On each of the above-mentioned amorphous alloy the surface of which had undergone the oxidation treatment, and on the untreated amorphous alloy having the same composition as the former, a lapping tape was caused to run at a speed of 4.75 cm/sec in order to measure their wear losses and to compare them.

The wear losses after 100 hours' running tests were 2 $\mu$m in the case of the autoclave treated amorphous alloy and 20 $\mu$m in the case of the autoclave untreated amorphous alloy.

Further, magnetic heads for an audio system were made of the oxidation treated amorphous alloy and the oxidation untreated amorphous alloy having the same composition, and a cassette tape coated with $\gamma$-$Fe_2O_3$ was caused to run at a speed of 4.75 cm/sec on the respective magnetic heads in order to measure their wear losses and to compare them. The wear losses after 100 hours' running trests were 0.5 $\mu$m in the case of the autoclave treated amorphous alloy and 5 $\mu$m in the case of the autoclave untreated amorphous alloy, and this indicates that the former had a noticeably improved wear resistance.

EXAMPLE 2

By the use of a single roll process, a $(Co_{0.90}Fe_{0.06}Cr_{0.04})_{77}Si_{10}B_{13}$ amorphous alloy of 10 mm in width and 20 $\mu$m in thickness was prepared. A portion of the prepared alloy was cut off therefrom to obtain a sample of approximately 5 m in length, and the sample was exposed to conditions of 300° C. and 80 atm for a period of 24 hours in an autoclave. The sample removed therefrom had a black surface. According to the observation of the surface state on the sample with the aid of an SEM, it was found that crystalline oxides as fine as approximately 0.5 $\mu$m were deposited on the amorphous alloy. The identification of the deposited crystalline oxide was carried out by the use of an X-ray diffractometry, and it was judged that it included $Co_3O_4$ as a main component and other crystalline oxides which could not be identified.

On each of the oxidation treated amorphous alloy and the oxidation untreated amorphous alloy having the same composition, a VTR tape coated with Co-$\gamma$-$Fe_2O_3$ was caused to run at a speed of 7 m/sec in order to measure their wear losses and to compare both of them.

The wear losses after 100 hours' running tests were 3 $\mu$m in the case of the autoclave treated amorphous alloy and 45 $\mu$m in the case of the autoclave untreated amorphous alloy, and this indicates that the former had a noticeably improved wear resistance.

EXAMPLE 3

By the use of a single roll process, $(Co_{0.91}Fe_{0.06}M_{0.03})_{75}Si_{10}B_{15}$ amorphous alloys (M: Mo, Nb and Ta, respectively) of 10 mm in width and 20 μm in thickness were prepared. A portion of each alloy was cut off therefrom to obtain a sample of approximately 5 m in length, and each sample was exposed to conditions of 300° C. and 80 atm for a period of 24 hours in an autoclave. All the samples had black surfaces. According to the observation of the surface state on each sample with the aid of an SEM, it was found that crystalline oxides having a size of nearly 0.5 μm were finely deposited on the amorphous alloy.

Figure 2:
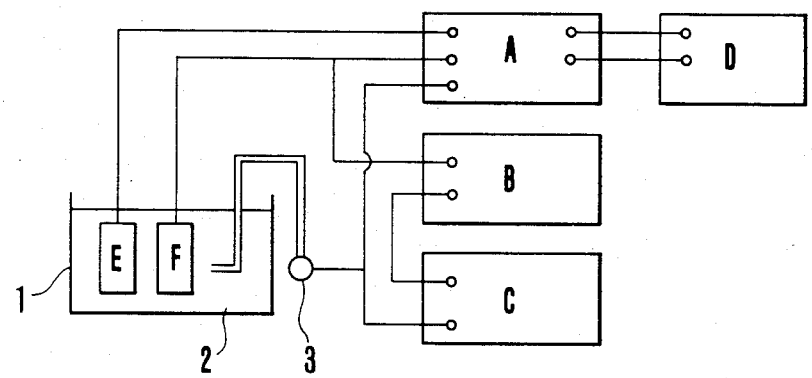
FIG. 2 is a flow sheet of a constant-potential electrolysis device for evaluating anticorrosion.

A polarization resistance in water was measured for the respective autoclave treated samples by the use of a constant-potential electrolysis device schematically exhibited in FIG. 2, and comparison was then made with the autoclave untreated samples.

Here, in FIG. 2, A is a potentiostat, B is an electrometer, C is a function generator, D is a recorder, E is an auxiliary electrode, F is the sample, reference numeral 1 is an electrolytic cell, 2 is a corrosion liquid and 3 is a reference electrode, respectively.

The polarization resistances of the autoclave untreated samples were 25Ω, 20Ω and 20Ω with regard to the samples in which M was Mo, Nb and Ta, respectively. On the other hand, the polarization resistances of the autoclave treated samples were in excess of 1000Ω with regard to all the samples in which M was Mo, Nb and Ta, and this indicates that the treated samples had a noticeable corrosion resistance. Similar tests were carried out in aqueous solutions of 0.1N-HCl and 0.1N-NaCl, and the results of these tests indicate that the autoclave treated materials had nearly 100 times as high a corrosion resistance as the autoclave untreated materials.

EXAMPLE 4

By the use of a single roll process, an $(Fe_{0.95}Nb_{0.05})_{82}Si_6B_{12}$ amorphous alloy of 10 mm in width and 20 μm in thickness was prepared. A portion of the alloy was cut off therefrom to obtain a sample of approximately 5 m in length, and the sample was exposed to conditions of 350° C. and 90 atm for a period of 24 hours in an autoclave. The sample removed therefrom had a black surface. According to the observation of the surface state on the sample with the aid of an SEM, it was found that crystalline oxides as fine as approximately 0.8 μm were deposited on the amorphous alloy. The identification of the deposited crystalline oxide was carried out by the use of an X-ray diffractometry, and it was judged that it mainly comprised $Fe_3O_4$.

Figure 3:
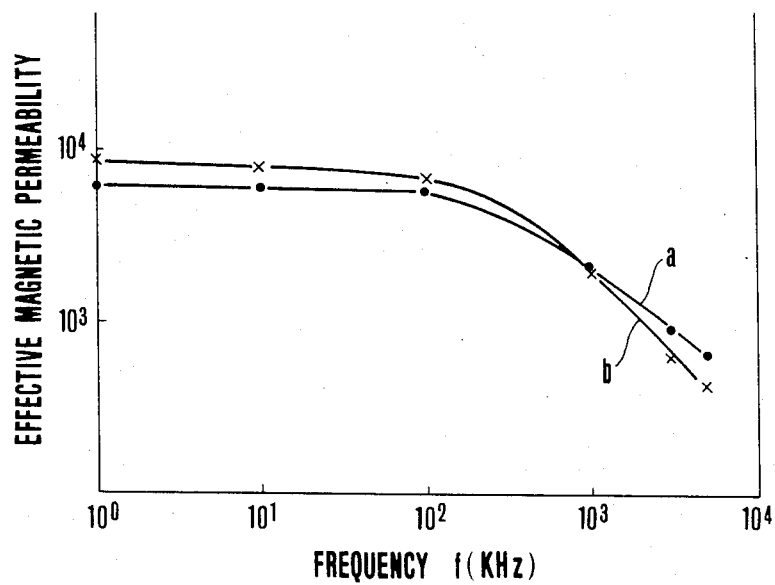
FIG. 3 is a diagram showing a variation in an effective magnetic permeability of the amorphous alloy according to this invention.

Effective magnetic permeabilities within the range of 1 to 5,000 KHz were measured on the amorphous alloy the surface of which had undergone the autoclave treatment and another amorphous alloy which had undergone a heat treatment at 350° C. in vacuo. The obtained results are set forth in FIG. 3. In FIG. 3, a curve a represents a variation of the effective magnetic permeabilities of the amorphous alloy according to this invention and another curve b represents a variation of those of the amorphous alloy thermally treated in vacuo.

It is definite from FIG. 3 that the autoclave treated amorphous alloy according to this invention had a higher magnetic permeability particularly in a mega-Hertz ($10^3$ KHz) zone, as compared with the amorphous alloy thermally treated in vacuo, therefore it will be understood that the amorphous alloy according to this invention is suitable for a VTR magnetic head.

Further, the oxidation treated amorphous alloy having the oxide layer including the crystalline oxide according to this invention is good in point of a wetting character with glass, and it thus has a feature that a laminating treatment is easy to conduct in manufacturing a magnetic head, especially a video head.

As described with reference to the above examples, the amorphous alloy according to this invention possesses a remarkable corrosion resistance and wear resistance and had an improved magnetic permeability in the mega-Hertz zone, therefore it can be estimated to be highly practical.

We claim:

1. A corrosion-resistant and wear-resistant magnetic amorphous alloy characterized by having, on the surface thereof, an oxide layer including a crystalline oxide, produced by oxidizing said alloy, wherein said magnetic amorphous alloy is represented by the following formula:

$(Co_{1-x-y}Fe_xM_y)_zG_{100-z}$ or $(Co_{1-x-y}Fe_xM_y)_uT_{100-u}$ 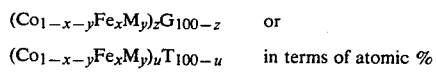 in terms of atomic % wherein
M is at least one element selected from the group consisting of Ti, V, Cr, Mn, Ni, Cu, Zr, Nb, Mo, Ru, Rh, Pd, Ag, Hf, Ta, W, Re, Pt, Au, Y and rare earth elements;
G is at least one element selected from the group consisting of B, C, Si, P and Ge;
T is at least one element selected from the group consisting of Ti, Zr, Hf, V, Nb, Ta, W, Mo, Y and rare earth elements; and
x, y, z and u are values satisfying the relations of $0 \leq x \leq$, $0 \leq y \leq 0.2$, $65 \leq z \leq 90$ and $85 \leq u \leq 95$, respectively.

2. A corrsion-resistant and wear-resistant magnetic amorphous alloy according to claim 1, wherein the size of said crystalline oxide is within the range of 0.01 to 5 μm.

3. A corrosion-resistant and wear-resistant magnetic amorphous alloy according to claim 1, wherein the thickness of said oxide layer is within the range of 0.05 to 5 μm.

4. A corrosion-resistant and wear-resistant magnetic amorphous alloy according to claim 1, wherein said amorphous alloy is applicable to a magnetic head.

5. A method for preparing a corrosion-resistant and wear-resistant magnetic amorphous alloy characterized by carrying out the oxidation treatment of said magnetic amorphous alloy at a temperature of from about 150° to 500° C. and a pressure of from about 60 to 100 atm in order to form an oxide layer including a crystalline oxide on the surface of said magnetic amorphous alloy.

6. A method for preparing a corrosion-resistant and wear-resistant magnetic amorphous alloy according to claim 5, wherein said oxidation treatment is carried out under conditions of a temperature of from 250° to 400° C. and a pressure of from 60 to 100 atm.

7. A corrosion-resistant and wear-resistant magnetic amorphous alloy according to claim 2, wherein the thickness of said oxide layer is within the range of 0.05 to 5 μm.

8. A corrosion-resistant and wear-resistant magnetic amorphous alloy according to claim 1, wherein said oxide layer is prepared by a process comprising the step of subjecting said magnetic amorphous alloy to oxidation at a high temperature and a high pressure.

9. A corrosion-resistant and wear-resistant magnetic amorphous alloy according to claim 8, wherein said oxidation is carried out at a temperature of about 150° to about 500° C. and at a pressure of about 40 to about 200 atm.

10. A corrosion-resistant and wear-resistant magnetic amorphous alloy according to claim 9, wherein said oxidation is carried out at a temperature of about 250° to about 400° C. and a pressure of about 60 to about 100 atm.

* * * * *